United States Patent [19]

Yoshinaka et al.

[11] Patent Number: 4,996,291

[45] Date of Patent: Feb. 26, 1991

[54] THERMO-SHRINKABLE POLYESTER FILM

[75] Inventors: Yasuo Yoshinaka; Katsuaki Kuze, both of Shiga; Tsutomu Isaka, Komaki; Toshihiro Yamashita, Inuyama; Yujiro Matsuyama, Otsu; Koichiro Nakamura, Shiga; Tsuyoshi Matsunaga, Fukui; Osamu Makimura, Ogaki, all of Japan

[73] Assignee: Toyo Boseki Kabushiki Kaisha, Osaka, Japan

[21] Appl. No.: 405,107

[22] Filed: Sep. 8, 1989

Related U.S. Application Data

[63] Continuation of Ser. No. 134,742, Dec. 18, 1987, abandoned.

[30] Foreign Application Priority Data

| Dec. 19, 1986 | [JP] | Japan | 61-305083 |
| Dec. 29, 1986 | [JP] | Japan | 61-313318 |
| Jun. 25, 1987 | [JP] | Japan | 62-159412 |
| Nov. 25, 1987 | [JP] | Japan | 62-296890 |
| Nov. 25, 1987 | [JP] | Japan | 62-296891 |
| Dec. 18, 1987 | [JP] | Japan | 62-322217 |

[51] Int. Cl.$^5$ .................................... C08G 63/02
[52] U.S. Cl. .................... 528/272; 528/308.1; 528/308.2; 528/308.6; 528/502; 528/503; 264/210.7; 264/211.12
[58] Field of Search ............... 528/272, 308.1, 308.2, 528/308.6, 502, 503; 264/210.7, 211.12

[56] References Cited

U.S. PATENT DOCUMENTS

| 3,477,989 | 11/1969 | Zarn et al. | 528/193 |
| 4,020,141 | 4/1977 | Quinn et al. | 264/289 |
| 4,766,033 | 8/1988 | Yoshimura et al. | 428/332 |

FOREIGN PATENT DOCUMENTS

| 0210646 | 4/1987 | European Pat. Off. |
| 0267799 | 5/1988 | European Pat. Off. |
| 1303845 | 8/1962 | France |
| 1438863 | 4/1966 | France |
| 61-203161 | 9/1986 | Japan |
| 793907 | 4/1958 | United Kingdom |
| 977104 | 12/1964 | United Kingdom |

Primary Examiner—John Kight, III
Assistant Examiner—S. A. Acquah
Attorney, Agent, or Firm—Leydig, Voit & Mayer

[57] ABSTRACT

A thermo-shrinkable polyester film of this invention is obtained from a composition that comprises acid components including terephthalic acid and glycol components including ethyleneglycol. The polyester film has a heat-shrinkage ratio of 30% or more in a certain direction at 100° C., and a shrinkage ratio of 5% or more at the point of intersection of a curve showing the internal shrinkage stress of the film and a curve showing the tensile stress of the film.

9 Claims, 1 Drawing Sheet

FIG.1

THERMO-SHRINKABLE POLYESTER FILM

This is a continuation of copending application Ser. No. 07/134,742, filed on Dec. 18, 1987, now abandoned.

BACKGROUND OF THE INVENTION

1. Field of the Invention

This invention relates to a thermo-shrinkable film that is suitable for use as a wrapping material to be used as a covering, to hold objects together, as an outer wrapping, etc. In particular, it relates to a polyester-type film (here and below, the word "film" also includes the meaning "sheet") with thermoshrinkable properties that is suitable for use as a wrapping material.

2. Description of the Prior Art

Thermo-shrinkable plastic films are used as coverings, to hold objects together, and as an outer wrapping for bottles (including both glass and plastic bottles), cans, and other kinds of containers, and for cylindrical objects (pipes, rods, wood, and other kinds of cylindrical objects). For example, such films are used for covering the cap, shoulder, or bulge of bottles, or for the entire bottle, for the purpose of labelling, protection, parceling, or increasing the value of the product, and for other reasons. In addition, such films may be used as a covering to package such objects as boxes, bottles, boards, rods, or notebooks together in groups, and such films may also be attached closely as a wrapping. The uses mentioned above take advantage of the shrinkability and the shrinking stress of the film.

As the material for the film mentioned above, polyvinylchloride, polystyrene, polyethylene, hydrochlorinated rubber, etc. can be used. Usually, these films are made into a tube shape, and after being wrapped around a bottle or around more than one pipe, for example, the film is shrunk by the application of heat so as to wrap or parcel together the object or objects.

However, the conventional thermo-shrinkable plastic films described above have the following disadvantages.

(a) One-axis shrinkability

When the thermo-shrinkable films mentioned above are, for example, wrapped around a bottle and shrunk around the circumference of the bottle so as to make a label, it is desirable that the films can shrink greatly in one specific direction (around the bottle), and not shrink in the direction at right angles to this direction (that is, the long axis of the bottle). To increase the shrinkability of a film like this in one direction only, it is effective to stretch the film so as to orient the polymer molecules that form the film in the said direction. However, when the polymer molecules are oriented, the film readily splits, and in addition, because fibrillation has become easier, the strength of the film decreases. In particular, if the bottle mentioned above is dropped, the strength of the film in the direction of the long axis of the bottle is important for preventing breakage of the bottle, and therefore an oriented polymer film obtained by stretching in only one direction is not necessarily appropriate. In other uses, the property of conferring resistance to shock is often of importance, as well.

(b) Resistance to heat

The conventional films mentioned above cannot withstand either boiling or retorting, so they cannot undergo sterilization procedures at high temperatures. For example, if the conventional films mentioned above are retorted at high temperatures, they rupture during treatment.

(c) Printability

If, for example, polyvinylchloride film is printed by the half-tone process, its compatibility with the ink is poor. Also, because the heat-resistance of polyvinyl chloride is poor, polymer gel is likely to be formed in the film when the film is being made. Therefore, ink-pinholes form readily during printing because of these polymer gel. For that reason, during a continuous tube-formation and printing process, ink-pinholes develop in the long film. If this film is supplied to an automatic labeling machine, the product is formed with the pinholes still in existence, which requires a final inspection of all products, resulting in a decrease of productivity. If pinholes are eliminated by inspection after printing is finished, then, after the area with pinholes is cut out, the remaining portions are joined with adhesive tape, so that the film will once more be continuous. For this reason, products containing seams are made, so a step in which these unacceptable products are identified and removed becomes necessary.

With the conventional films mentioned above, there is shrinkage with the passage of time after manufacture, and this shrinkage causes a decrease in the pitch of printing, so that it is not possible to print with high accuracy. This shrinkage with time proceeds under a temperature at which the films are delivered. Therefore, shrinkable film made of polyvinyl chloride, etc., for example, must be stored in a low-temperature warehouse, or delivered by refrigerator car.

(d) Crazing

Crazing occurs readily with polyethylene film. Therefore, for example, if a chemical agent comes in contact with the film during use, the film is readily damaged. Crazing also gives rise to a rough surface for printing.

(e) Industrial waste pollution

When, for example, polyvinylchloride film is burned, hydrogen chloride gas is produced, giving rise to the problem of corrosion of the incinerator and of environmental pollution.

(f) Shrinkage spots

With the conventional films mentioned above, shrinkage in response to heat is often not uniform. When heating gives rise to some areas that are satisfactorily shrunken and also to areas with insufficient shrinkage, the surface of the film forms irregular protrusions and indentations, and does not fit to the object that it encloses. This tendency is particularly strong in high-speed wrapping, in which the heat-shrinkage occurs in a short period of time. If the film is printed with metallic ink, there is the demerit that conspicuous colored spots will form because of the uneven shrinkage.

SUMMARY OF THE INVENTION

The thermo-shrinkable polyester film of this invention overcomes the defects mentioned above of the conventional films and many other such defects as well.

The thermo-shrinkable polyester film of this invention is obtained from a composition that comprises acid components including terephthalic acid and glycol components including ethyleneglycol. The thermo-shrinkable polyester film has a heat-shrinkage ratio of 30% or more in a certain direction at 100° C., and has a shrinkage ratio of 5% or more at the point of intersection of a curve showing the internal shrinkage stress of the film and a curve showing the tensile stress of the film.

In a preferred embodiment, the film has a transformation ratio of 0.175 or more.

In a preferred embodiment, the glycol components include the compounds with the following general formulae (I) and/or (II) in the range of 3 to 65 percent by mole based on total moles of glycol components:

wherein $R_1$ and $R_2$ are independently $C_1$-$C_5$ alkyl, wherein —X— is —$CH_2$—, $$-\underset{\underset{CH_3}{|}}{\overset{\overset{CH_3}{|}}{C}}-,$$

—O—, —$SO_2$—, —S—, or $$-\underset{\underset{CF_3}{|}}{\overset{\overset{CF_3}{|}}{C}}-;$$

$R_3$ and $R_4$ are independently hydrogen, $C_1$-$C_5$ alkyl, or halogen; l is 0 or 1, m and n are both an integer of 1 to 5; o and p are both an integer of 1 to 4.

Thus, the invention disclosed herein makes possible the objectives of:

(1) providing a thermo-shrinkable film with large (40-70%) shrinkability in response to heat, by which, for example, a bottle that has a large diameter and a cap portion with a small diameter can readily be covered;

(2) providing a thermo-shrinkable film that, in a fixed range of temperature, has sufficiently great shrinkage in a certain direction, and extremely slight shrinkage in the direction at right angles to the certain direction;

(3) providing a thermo-shrinkable film that has high heat-shrinkage stress, so that when used, for example, to parcel objects together, its properties in holding the objects together are superior;

(4) providing a film that can be shrunk at relatively low temperature, so that when shrunk at these low temperatures, the shape of plastic bottles made of polyester, polyethylene, polypropylene, polyvinylchloride, styrene, etc., will not be changed by the application of heat;

(5) providing a thermo-shrinkable film that has great ability to maintain shrinkage stress, so that if there are areas that are shrunk too much and areas that are shrunk too little temporarily, by the application of heat, this condition can be corrected, so that a uniformly shrunken film can be obtained;

(6) providing a thermo-shrinkable film that has excellent heat-resistance properties, so that it can withstand treatment by boiling or retorting;

(7) providing a thermo-shrinkable film that has excellent compatibility with printing ink, which moreover does not give rise to pinholes in its printed surface when printed by the half-tone process;

(8) providing a thermo-shrinkable film that does not change the pitch of printing by shrinking with the passage of time;

(9) providing a thermo-shrinkable film that does not give rise to crazing, so that it is not damaged by chemical agents, etc.;

(10) providing a thermo-shrinkable film that does not pollute the environment when burned, because it does not give off noxious gases when burned; and (11) providing a film the composition of which is the same as that of polyester bottles, so that when used bottles are collected and melted for reuse, the said film can be melted and reused in the same procedure together with the bottle.

DESCRIPTION OF THE PREFERRED EMBODIMENT

The thermo-shrinkable polyester film of this invention is obtained from a composition that comprises acid components including terephthalic acid and glycol components including ethyleneglycol.

The acid components mentioned above are largely terephthalic acid, but it is also possible to include other acid compounds provided that the properties of the film obtained are not changed so greatly as to move outside of a certain range. The acid components include, for example, dibasic fatty acids such as adipic acid, sebacic acid, azelaic acid; dibasic aromatic acids such as isophthalic acid, diphenyldicarboxylic acid, 5-tert-butylisophthalic acid, 2,2,6,6-tetramethylbiphenyl-4,4-dicarboxylic acid, 2,6-naphthalenedicarboxylic acid, and 1,1,3-trimethyl-3-phenylindene-4,5-dicarboxylic acid.

As the glycol components mentioned above, in addition to ethyleneglycol, the chemical compounds shown below in general formulae (I) and (II) are preferred for use:

wherein $R_1$ and $R_2$ are independently $C_1$-$C_5$ alkyl, wherein —X— is —CH$_2$—,

—O—, —SO$_2$—, —S—,

R$_3$ and R$_4$ are independently hydrogen, C$_1$–C$_5$ alkyl, or halogen; l is 0 or 1, m and n are both an integer of 1 to 5; o and p are both an integer of 1 to 4.

The chemical compounds shown above by general formula (I) include: neopentylglycol, 2-methyl-2-ethyl-1,3-propanediol, 2-methyl-2-n-propyl-1,3-propanediol, 2-methyl-isopropyl-1,3-propanediol, 2-methyl-2-n-butyl-1,3-propanediol, 2-methyl-2-n-heptyl-1,3-propanediol, 2-methyl-2-n-hexyl-1,3-propanediol, 2,2-diethyl-1,3-propanediol, 2-ethyl-2-n-propyl-1,3-propanediol, 2-ethyl-isopropyl-1,3-propanediol, 2-ethyl-n-butyl-1,3-propanediol, 2-ethyl-n-heptyl-1,3-propanediol, 2-ethyl-n-hexyl-1,3-propanediol, 2,2-di-n-propyl-1,3-propanediol, 2-n-propyl-2-n-butyl-1,3-propanediol, 2-n-propyl-2-n-heptyl-1,3-propanediol, 2-n-propyl-2-n-hexyl-1,3-propanediol, 2,2-di-n-butyl-1,3-propanediol, 2-n-butyl-2-n-heptyl-1,3-propanediol, 2-n-butyl-2-n-hexyl-1,3-propanediol, 2,2-di-n-heptyl-1,3-propanediol, 2-n-heptyl-2-n-hexyl-1,3-propanediol, 2,2-di-n-hexyl-1,3-propanediol, etc.

The chemical compounds shown above by general formula (II) includes: 2,2-bis(4-hydroxyethoxyphenyl)propane, bis(4-hydroxyethoxyphenyl)methane, bis(4-hydroxyethoxyphenyl)ether, bis(4-hydroxyethoxyphenyl)thioether, bis(4-hydroxyethoxyphenyl)sulfone, 2,2-bis(4-hydroxyethoxyphenyl)perfluoropropane, 2,2-bis(3-hydroxyethoxyphenyl)propane, 2,2-bis[3,5-dimethyl-(4-hydroxyethoxy)phenyl]propane, 2,2-bis[3,5-diethyl-(4-hydroxyethoxy)phenyl]propane, 2,2-bis[3,5-diisopropyl(4-hydroxyethoxy)phenyl]propane, 2,2-bis[3,5-ditert-butyl-(4-hydroxyethoxy)phenyl]propane, 2,2-bis[3,5-dipentyl-(4-hydroxyethoxy)phenyl]propane, 2,2-bis[1-methyl-5-ethyl-(4-hydroxyethoxyphenyl]propane, 2,2-bis[1-methyl-5-tert-butyl-(4-hydroxyethoxy)phenyl]propane, 2,2-bis[3-methyl-(4-hydroxyethoxy)phenyl]propane, 2,2-bis(3-sec-butyl-(4-hydroxyethoxy)phenyl]propane, 2,2-bis[3-isopropyl-(4-hydroxyethoxy)phenyl]propane, bis[3,5-dimethyl-(4-hydroxyethoxy)phenyl]sulfone, bis[3,5-dimethyl-(4-hydroxyethoxy)phenyl]thioether, bis[3,5-dimethyl-(4-hydroxyethoxy)phenyl]ether, [3,5-dimethyl(4-hydroxyethoxy)]diphenyl, bis[3,5-dimethyl-(4-hydroxyethoxy)phenyl]hexafluoropropane, 2,2-bis[3,5-dichloro-(4-hydroxyethoxy)phenyl]propane, 2,2-bis[3,5-dibromo-(4-hydroxyethoxy)phenyl]propane, bis[3,5-dibromo-(4-hydroxyethoxy)phenyl]sulfone, bis(3,5-dimethyl-(4-hydroxyethoxy)phenyl]methane, etc.

It is possible to include other glycol components provided that the properties of the film that is obtained are not changed so greatly as to move out of a certain range. The other glycol compounds include: aliphatic diols such as diethyleneglycol, propyleneglycol, butanediol, hexanediol, etc.; alicyclic diols such as 1,4-cyclohexanedimethanol, etc., and aromatic diols such as xylyleneglycol, etc.

Polyester that includes the acid components and glycol components mentioned above can be prepared by a conventional method. That method may be, for example, the direct esterification method in which dicarboxylic acid and diol are allowed to react directly, or the transesterification method in which dicarboxylic acid dimethylester and diol are reacted.

The polyester obtained in this way is the main component of the polyester-containing compositions that form the film of this invention. In the compositions mentioned above, it is also possible to include other kinds of polyesters other than the one described above. By adjustment of the polyesters that are included, it is possible to obtain a thermoshrinkable film that has the desired properties. Here, the glycol component shown by the above formulae (I) and/or (II) should be at the proportion of 65 mole % or less of the glycol components in all of the polyester, and preferably from 3 to 40 mole %, more preferably, it should be from 5 to 30 mole %. In particular, when the proportion of the glycol component used is 3 mole % or more, the property by which the film obtained has a large shrinkage ratio in a certain direction, with a small shrinkage ratio at right angles to that direction, is particularly striking. In addition, when the film obtained is shrunk by the application of heat, there is also the advantage that there is sufficient maintenance of internal stress. For that reason, when, for example, a bottle is covered with the film, and the film is shrunk by the application of heat, after which there is sterilization of the bottle by heat treatment, there is no slackness at such places as the shoulder of the bottle. Even if these glycol components are present in excess amounts, the effects on, for example, the maintenance of internal stress mentioned above does not increase in proportion to the amount of glycol components. If there is an excess of glycol components, the film obtained is amorphous, and its resistance to heat decreases.

In the composition, it is also possible to include any kind of additive in addition to the polyester mentioned above. There are, for example, titanium dioxide, granulated silica, kaolin, calcium carbonate, and other lubricants; anti-static agents; age resistors; ultraviolet-light absorbants; pigments (dyes, etc.).

The intrinsic viscosity of the compositions obtained is 0.55–1.3 dl/g, and preferably 0.58–1.2 dl/g; more preferably, it should be 0.63–1.2 dl/g.

The above compositions are formed into a film by any well-known method (such as extrusion, the calendar method, etc.). The shape of the film is not restricted in any way; for example, it can be a flat sheet or a tube. The film obtained can be stretched under the fixed conditions described below, for example, in a certain direction by from 4 to 10 times the original measurements, and preferably within the limits of 4.6 to 7.0 times. In the direction at right angles to the said direction, the film can be stretched to 1 to 2 times the original measurements, and preferably within the limits of 1.1 times to 1.8 times. The order of stretching can be with either direction first. By stretching of the film in the direction at right angles to the main direction of stretching, the shock resistance of the film obtained is increased, and moreover, the property of tearing in one direction is modified. If the stretching ratio in the direction at right angles mentioned above exceeds 2 times, the ratio of thermo-shrinkage in the direction at right angles to the main shrinkage direction becomes too large, and the finished product after heat-shrinkage undulates so that it is not uniform. For the film stretched at the proportions of stretching mentioned above, in general, in relation to the shrinkage ratio in the main direction, the shrinkage ratio in the direction at right angles to the main direction is 15% or less, and preferably 8–9%, more preferably, it is 5% or less; or, the expansion ratio is 5% or less. When a film with such properties is heat-treated, the finished product is uniform.

The stretching method can be by any usual method. As this method, for example, there are the roll stretching method, the long-gap stretching method, the tenter-stretching method, and the tubular stretching method. With use of any of these methods, it is possible to do double-axis stretching in succession, simultaneous double-axis stretching, single-axis stretching, or a combination of these. With the double-axis stretching mentioned above, it is possible to do stretching in the horizontal and vertical directions at the same time; or else stretching can be done first in one direction and then in the other direction to result in effective double-axis stretching; stretching can be done first in either direction.

Preferably, in the stretching mentioned above, the following step is then taken. First, for example, the film mentioned above is preliminarily heated at a temperature in the range of a mean glass transition temperature (Tg) of the polymer composition constituting the film to Tg+80° C. Then, by a step that involves 9/10 or less of the total stretching process, stretching is done at the temperature of Tg+75° C. or less, and then, the remaining 1/10 or more of the procedure is done at Tg+60° C. of less, and preferably at Tg +50° C. or less. If treatment is done within the temperature limits given above at the time of stretching in the main direction (main direction of shrinkage), it is possible to control the thermo-shrinkage in the direction at right angles to the said direction. Moreover, with treatment in the temperature limits of 80°±25° C., the heat-shrinkage ratio in the direction at right angles is approximately at its minimum.

In general, at the time of such stretching, heat setting takes place. For example, after stretching has taken place, it can be suggested that heating be done in the heating zone of 30°–150° C. for about 1–60 seconds. By this heat setting, it is possible to prevent changes in the measurements of the film obtained that might otherwise occur in the high temperatures of summer. After stretching of the film, but either before or after its heat setting, it is possible to cause stretching to a fixed extent. In that case, it is possible to stretch the film to a length 70% of the previous film length. In particular, when stretching is in the main direction of stretching, it is better for there not to be stretching in the nonshrinking direction (the direction at right angles to the main direction of shrinkage).

Furthermore, after the stretching mentioned above, an additional step of cooling the film while the film is being stressed under a stretched or tensed condition, or of the continued cooling of the film subsequent to the said treatment, after the tension has been removed, makes it possible to obtain a film with more satisfactory and more stable shrinkage properties.

The thermo-shrinkable polyester film obtained in this way has a heat-shrinkage ratio of 30% or more in a certain direction at the temperature of 100° C. Then, the heat-shrinkage ratio in the direction at right angles to the said direction is extremely small. The proportion of the shrinkage ratio in the direction at right angles to the certain direction mentioned above to the shrinkage ratio in the said certain direction can be measured as described below and is defined as a "transformation ratio." The film of this invention has a transformation ratio of 0.175 or more.

Figure 1:
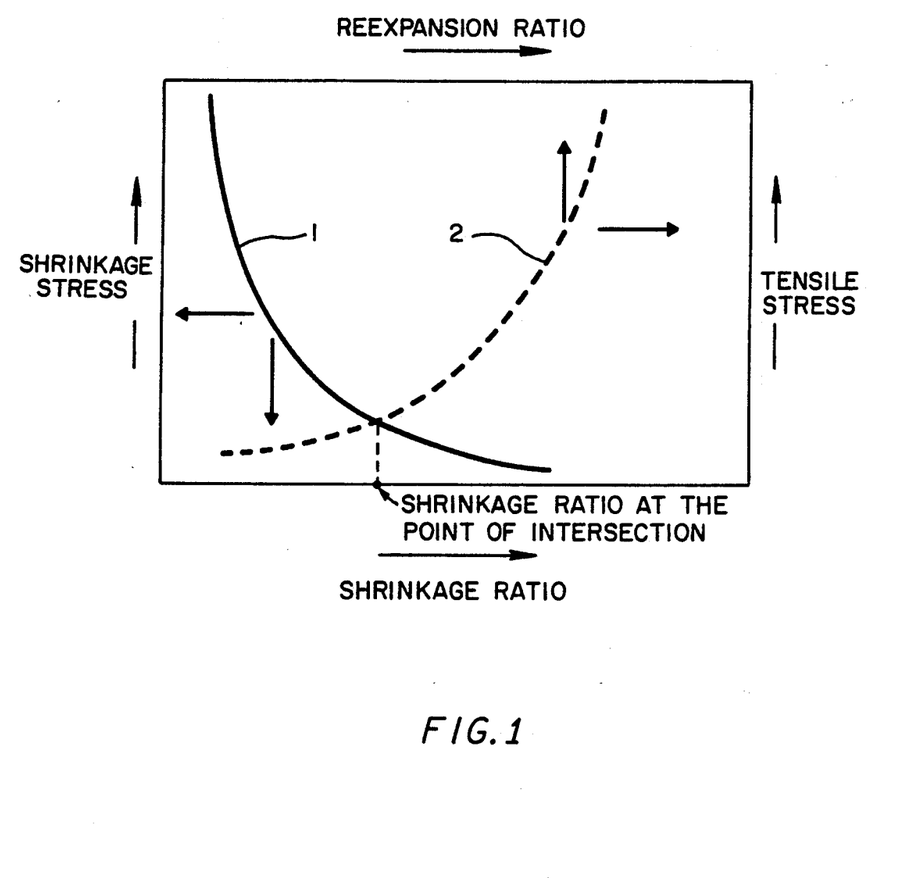
FIG. 1 is a graph for use in the explanation of the specifications in this invention for the shrinkage ratio at the point of intersection.

In addition, the film of this invention has a shrinkage ratio at the point of intersection of 5% or more. The shrinkage ratio of the film at the point of intersection can be defined as the shrinkage ratio at the point of intersection of the following two curves that express the properties of the film:

1. A curve (solid line in FIG. 1) that expresses the relationship of the shrinkage ratio (i.e., the ratio of the length of shrinkage, $L_0$-$L_1$ to the original length of the film $L_0$) and the strength of the internal residual stress of the film when a film with a fixed length $L_0$ is held loosely at a fixed interval $L_1$ (where $L_1 < L_0$), and then heat-shrunk; and 2. A curve (dotted line in FIG. 1) that expresses the relationship of the reexpansion ratio (i.e., the ratio of the pulling length, $L_2$-$L_3$ to the length of the heat-shrunken film $L_3$) and the pulling strength when a film has been heat-shrunk at a fixed length $L_3$ (=$L_0/2$), and then pulled back to the fixed length $L_2$ ($L_0 > L_2 > L_3$).

A detailed explanation of the method for measurement of this shrinkage ratio at the point of intersection will be given by reference to the examples described below.

When a film is shrunk to a shrinkage ratio that is less than the shrinkage ratio at the point of intersection of the film, for example, even when the shrinkage of the film is not uniform, there being shrinkage spots because of the localized application of heat, these spots of shrinkage spontaneously disappear. The reason is that the strength of the internal shrinkage stress of the film is larger than that of the tensile stress thereof at the localized areas of shrinkage. The heat-shrinkable film of this invention has a shrinkage ratio of at least 5% at the point of intersection, and it is possible to cause uniform shrinkage of such a film within a wide range of shrinkage ratios. With a film that has a shrinkage ratio of less than 5% at the point of intersection, the internal residual stress is released by slight shrinkage, so there is not enough internal residual stress to cause the other spots of shrinkage to disappear. That is, once spots of shrinkage have occurred, they remain.

The film obtained in this way has a surface orientation coefficient preferably in the range of $40 \times 10^{-3}$ to $120 \times 10^{-3}$. If the surface orientation coefficient is less than $40 \times 10^{-3}$, the shrinkage properties described above do not appear. That is, when the film is treated by the application of heat, wrinkling appears, colored spots develop, slackening occurs upon the application of heat, and other problems can occur. Also, at the time of thermo-shrinking or after thermo-shrinking, if the film is treated with heat such as boiling, retorting, and disinfection by hot water, then there is marked whitening of the film, which results in a poor appearance, because the polymers are oriented randomly. On the other hand, if the coefficient is greater than $120 \times 10^{-3}$, the strength of the film decreases, and even slight injury of the film can readily cause tearing. For example, if the film is wrapped around the outside of a bottle in order to reinforce it, the reinforcement effect is slight.

The birefringent index is preferably in the range of $20 \times 10^{-3}$ to $175 \times 10^{-3}$. When the birefringent index is less than $20 \times 10^{-3}$, the shrinkage ratio at the point of intersection is low. When such a film is treated by heat, wrinkling and spots of coloration from metallic inks appear. On the other hand, if the birefringent index is greater than $175 \times 10^{-3}$, the speed of shrinkage during the application of heat becomes too fast. In this situation, the difference in temperature in places that are close to the heat source and those that are far from the heat source, or the difference in temperature in places reached by a warm draft and those without such a draft can cause shrinkage defects. In other words, spots of shrinkage are very readily formed.

The thermo-shrinkable polyester film provided by this invention in this way can have its surface printed as necessary. By heat-shrinkage, the film can be put to all kinds of uses such as for covering, parceling, wrapping etc.

EXAMPLES

This invention will be explained by reference to the following examples. The methods for measurement in these examples were as follows.

(1) Haze

Haze was measured according to the method of JIS-K 6714.

(2) Heat-shrinkage ratio

A sample of film 15 mm wide was cut off, and a pair of index lines with a spacing of 200 mm between them were marked at right angles to the long direction of the sample. This sample was heated with hot air at a fixed temperature (either 80° C. or 100° C.) for one minute, and the shrinkage ratio was measured.

(3) Shrinkage ratio at the point of intersection (%)

A sample of film measuring 20 mm across and 150 mm long is obtained, and a pair of index lines with a spacing of 100 mm between them are marked at right angles to the long direction of the sample. A distance $L_1$ that is smaller than 100 mm and larger than 50 mm is established freely between a pair of chucks of a tension tester. Between these chucks, the film mentioned above (the sample) is placed and fixed at the index lines. This film is exposed to a hot blast of air at 100° C. to shrink it. The strength of the shrinking force is measured, and the residual shrinkage stress is obtained by use of the following equation.

Residual shrinkage stress = shrinkage force/sectional area

The shrinkage ratio at that time is calculated by use of the following equation.

$$\text{Shrinkage ratio} = \frac{100 - L_1}{100} \times 100(\%)$$

The value for $L_1$ is changed, and the measurements above are repeated; from the results, curve 1 (solid line in FIG. 1), which expresses the relationship between the shrinkage ratio and the strength of residual stress, is drawn.

Next, a new film is prepared in the same way as described above, and a pair of index lines with a spacing of 100 mm between them at the right angles to the long direction of the film are marked. An interval of 50 mm is established between a pair of chucks of a tension tester, and the film mentioned above is fixed at its lines by the pair of chucks. The fixed film is exposed to a hot blast of air at 100° C. to shrink it. A distance $L_2$ that is larger than 50 mm and smaller than 100 mm is chosen freely, and the strength needed to pull the shrunk film back to the length of $L_2$ is measured. With use of these results, the tensile strength is calculated by the following equation.

Tensile strength = pulling strength/sectional area

The reexpansion ratio at that time is calculated by the use of the following equation.

$$\text{Reexpansion ratio} = \frac{L_2 - 50}{50} \times 100(\%)$$

The value for $L_2$ is changed and the measurements above are repeated; from the results, curve 2 (dotted line in FIG. 1), which expresses the relationship between the tensile strength and the reexpansion ratio, is drawn. The shrinkage ratio that corresponds to the point of intersection of the curves 1 (showing the internal residual stress of the film) and 2 (showing the tensile stress of the film) mentioned above is the shrinkage ratio at the point of intersection.

(4) Retention time of residual stress by heat shrinkage (at 50% relaxation)

By a method similar to that mentioned above in section 3 for obtaining the tensile strength, a film is attached to a pair of chucks and exposed to a hot blast of air at 170° C. The time needed for the shrinkage stress to reach zero is measured.

(5) Transformation ratio

Film that had not been stretched and that was 200 μm thick was cut into a fixed size, and stretched to four times the original length in a certain direction at the temperature of the glass transition point plus 25° C. The length of the unstretched film in the direction of stretching was $A_1$, and the length of the stretched film in this direction was $A_2$. The length of the unstretched film in the direction at right angles to the direction of stretching was $B_1$, and the length of the stretched film in this direction was $B_2$.

The transformation ratio was defined as the proportion of transformation as shown in the following equation.

$$\text{Transformation ratio} = \frac{\frac{B_1 - B_2}{B_1}}{\frac{A_2 - A_1}{A_1}}$$

(6) Glass transition point

The glass transition point was measured by use of a differential scanning calorimeter (internal heat DSC, Rigaku Denki) with a rise of 10° C. per minute.

(7) Birefringent index and surface orientation coefficient

The birefringent index Δn and surface orientation coefficient $A_0$ of film were evaluated from the following equations:

$$\Delta n = |n_x - n_y|, \text{ and}$$

$$A_0 = \frac{n_x + n_y}{2} - n_z$$

wherein $n_x$ is the refractive index of the film in the main direction of stretching; $n_y$ is the refractive index thereof in the direction at right angles to the main direction; and $n_z$ is the refractive index thereof in the direction of film thickness. Here, these refractive indices were measured with an Abbe refractometer.

EXAMPLE 1

One hundred parts by mole of terephthalic acid as the dibasic acid component, 187 parts by mole of ethyleneglycol and 23 parts by mole of neopentyl glycol as the glycol components, and 0.05 mole of antimony trioxide as a catalyst (with respect to the acid component) were put into a stainless-steel autoclave, where polycondensation was done by the direct esterification method. The thermo-intrinsic viscosity of the resulting copolymers was 0.75 dl/g. This polyester was fusion-extruded at 300° C. to give a film 180 μm thick. The transformation ratio of this film was 0.181.

This unstretched film was heated for 8 seconds at 130° C., and then kept at 88° C. for half of the desired total stretching process, after which it was stretched along its width at 80° C., so that it became 5.2 times as long as the original length of the film. After being stretched, the film was cooled at 40° C. while being stretched along its width so that the stretched length of the width was about 3% of the previous width. The thickness of the film that was obtained was 40 μm; its birefringent index was $105 \times 10^{-3}$, and its surface orientation coefficient was $68 \times 10^{-3}$.

The physical properties of this thermo-shrinkable film are described in Table 1. From this table, it can be seen that the heat-shrinkage characteristics of this heat-shrinkable film are excellent. When this heat-shrinkable film was used to cover a bottle in a practical test, the results were satisfactory.

EXAMPLES 2 AND 3 AND COMPARATIVE EXAMPLES 1-3

The acid components and glycol components shown in Table 1 were used to prepare polyester as described in Example 1. To 60% by weight of this polyester, 40% by weight of polyethylene terephthalate (limiting viscosity, 0.8 dl/g) was added to give polyester compositions (Examples 2 and 3).

The composition used in Comparative Example 1 consists of polyethylene terephthalate with an intrinsic viscosity of 0.6 dl/g. The composition used in Comparative Example 2 consists of polyester that was prepared from the acid components and glycol components shown in Table 1 as described in Example 1. The composition used in Comparative Example 3 consists of polyvinyl chloride.

The transformation ratio of the compositions for Example 2, Example 3, Comparative Example 1, and Comparative Example 3 were 0.177, 0.183, 0.170, and 0.174, respectively. These compositions were used and measured by the methods described in Example 1 for Examples 2 and 3. The surface orientation coefficient of film was $71 \times 10^{-3}$ for Example 2 and $60 \times 10^{-3}$ for Example 3. The birefringent index was $107 \times 10^{-3}$ for Example 2 and $104 \times 10^{-3}$ for Example 3. In Comparative Example 1, an unstretched film was stretched 4.2 times the width of the original sample at 95° C. and cooled at 40° C. The surface orientation coefficient of the film that was obtained was $45 \times 10^{-3}$, and the birefringent index was $72 \times 10^{-3}$. These physical properties are shown in Table 1. Table 1 shows that the films of Examples 2 and 3 have high shrinkage ratios at the point of intersection, and it can also be seen there that maintenance of remaining stress was satisfactory. The heat-shrinkage ratio of the direction at right angles to the main shrinkage direction was low, and no wrinkling at all was seen in places with much shrinkage. When the surface of the film was printed with metallic ink, no spots of coloration were found.

When the film obtained was used to cover a polyester bottle, it followed the shape of the polyester bottle without fail so as to cover the bottle tightly. This film did not curve in a particular direction, nor did it give rise to undulation-like wrinkles. On the contrary, the film of Comparative Example 2, with its low shrinkage ratio at the point of intersection, had a high thermo-shrinkage ratio of the direction at right angles to the main direction of shrinkage. When this film was used to cover a polyester bottle as mentioned above, the area at the top of the bottle where the diameter was small was covered with film that, because of its high shrinkage, had wrinkles and spots of coloration; also, the film had undulation-like wrinkles at the upper and lower portions thereof. The outer appearance was very unsatisfactory, and the product could not be used commercially.

EXAMPLES 4-6 AND COMPARATIVE EXAMPLES 4 AND 5

The same composition as in Example 3 was used, and the stretching ratio was changed to have various values to give films with the shrinkage ratio at the point of intersection shown in Table 1. The surface orientation coefficients of the films were $73 \times 10^{-3}$, $75 \times 10^{-3}$, $79 \times 10^{-3}$, $38 \times 10^{-3}$, and $34 \times 10^{-3}$. The birefringent indices were $108 \times 10^{-3}$, $113 \times 10^{-3}$, $116 \times 10^{-3}$, $37 \times 10^{-3}$, and $33 \times 10^{-3}$. The physical properties of the films and the results of tests for a practical use are shown in Table 1.

Table 1 shows that the finished results of the areas with a high degree of stretch were poor when the shrinkage ratio at the point of intersection was low, and that the portions of the film printed with metallic ink gave rise to colored spots.

COMPARATIVE EXAMPLE 6

Polyester was prepared following the methods of Example 1 with the use of terephthalic acid (100 parts by mole) as the acid component and of ethylene glycol (50 parts by mole) and neopentylglycol (50 parts by mole) as the glycol components. This polyester was used to make a film by the methods of Example 1. The heat-resistance of the polyester was low, so that when the film was stretched by the use of tenter, the clipped areas thereof were ripped, making it difficult to prepare the film.

EXAMPLE 7

The same copolymers as obtained in Comparative Example 6 were used to prepare a composition that was mixed with 15 percent by weight of ethylene terephthalate. With the use of this material, a film was obtained, and stretched under the same conditions as in Example 1. The surface orientation coefficient of the resulting heat-shrinkable film was $69 \times 10^{-3}$, and its birefringent index was $118 \times 10^{-3}$. This film had satisfactory characteristics, as shown in Table 1.

EXAMPLES 8–13

With the use of the compositions shown in Table 1, films were prepared under the same conditions as in Example 1. The notations A to E in the column "Other glycol components" shown in Table 1 refer to the following compounds:

A: 2,2-diethyl-1,3-propanediol
B: 2-ethyl-2-n-butyl-1,3-propanediol
C: 2,2-bis(4-hydroxymethoxyphenyl)propane
D: bis(4-hydroxyethoxyphenyl)sulfone
E: bis[3,5-dimethyl-(4-hydroxyethoxyphenyl]-sulfone The physical properties of the thermo-shrinkable films obtained were as shown in Table 1. Table 1 shows that in all of the tests of practical uses when these films were used, the results obtained were satisfactory.

TABLE 1

|  |  |  | Example 1 | Example 2 | Example 3 | Comparative Example 1 | Comparative Example 2 | Comparative Example 3 | Example 4 | Example 5 | Example 6 | Comparative Example 4 | Comparative Example 5 | Comparative Example 6 |
|---|---|---|---|---|---|---|---|---|---|---|---|---|---|---|
| Polyester composition | Polyethylene telephthalate (wt %) |  | 0 | 40 | 40 | 100 | 0 | 0 | 40 | 40 | 40 | 40 | 40 | 0 |
|  | Other polyesters (wt %) |  | 100 | 60 | 60 | 0 | 100 | 0 | 60 | 60 | 60 | 60 | 60 | 100 |
|  | Acid components in other polyesters (mol %) | Telephthalic acid | 100 | 100 | 100 | 0 | 90 | 0 | 100 | 100 | 100 | 100 | 100 | 100 |
|  |  | Isophthalic acid | 0 | 0 | 0 | 0 | 10 | 0 | 0 | 0 | 0 | 0 | 0 | 0 |
|  | Glycol components in other polyesters (mol %) | Ethylene glycol | 85 | 92 | 65 | 0 | 100 | 0 | 65 | 65 | 65 | 65 | 65 | 50 |
|  |  | Neopentyl glycol | 15 | 8 | 35 | 0 | 0 | 0 | 35 | 35 | 35 | 35 | 35 | 50 |
|  |  | Other glycol components | 0 | 0 | 0 | 0 | 0 | 0 | 0 | 0 | 0 | 0 | 0 | 0 |
| Transformation ratio |  |  | 0.181 | 0.177 | 0.183 | 0.170 | 0.174 | — | 0.193 | 0.193 | 0.193 | 0.193 | 0.193 | 0.197 |
| Stretching ratio |  |  | 5.2 | 5.2 | 5.2 | 4.2 | 4.6 | — | 5.4 | 5.4 | 5.4 | 4.0 | 3.5 | 4.0 |

|  |  |  | Example 7 | Example 8 | Example 9 | Example 10 | Example 11 | Example 12 | Example 13 |
|---|---|---|---|---|---|---|---|---|---|
| Polyester composition | Polyethylene telephthalate (wt %) |  | 15 | 0 | 50 | 50 | 0 | 0 | 0 |
|  | Other polyesters (wt %) |  | 85 | 100 | 50 | 50 | 100 | 100 | 100 |
|  | Acid components in other polyesters (mol %) | Telephthalic acid | 100 | 100 | 100 | 100 | 100 | 100 | 100 |
|  |  | Isophthalic acid | 0 | 0 | 0 | 0 | 0 | 0 | 0 |
|  | Glycol components in other polyesters (mol %) | Ethylene glycol | 50 | 80 | 70 | 70 | 80 | 80 | 80 |
|  |  | Neopentyl glycol | 50 | 0 | 0 | 0 | 0 | 0 | 0 |
|  |  | Other glycol components | 0 | A 20 | A 30 | B 30 | C 20 | D 20 | E 20 |
| Transformation ratio |  |  | 0.195 | 0.191 | 0.179 | 0.182 | 0.188 | 0.185 | 0.190 |
| Stretching ratio |  |  | 5.1 | 5.2 | 5.2 | 5.2 | 5.4 | 5.2 | 5.2 |

|  |  | Example 1 | Example 2 | Example 3 | Comparative Example 1 | Comparative Example 2 | Comparative Example 3 | Example 4 | Example 5 | Example 6 |
|---|---|---|---|---|---|---|---|---|---|---|
| Haze (%) |  | 1.8 | 2.1 | 1.6 | 3 | 3.0 | 3.5 | 1.7 | 1.6 | 1.6 |
| Heat-shrinkage ratio | Main direction of stretching 80° C. (%) | −1.5 | 0.3 | −2.3 | 7.8 | 7.1 | 4.5 | 1.1 | −3.1 | −3.5 |
|  | Direction at right angles 80° C. (%) | 54 | 48 | 63 | 26 | 32 | 46 | 42 | 62 | 66 |
|  | Main direction of stretching 100° C. (%) | −0.3 | 3.6 | −1.5 | 11.2 | 13 | 6.0 | 6.8 | −1.3 | −1.7 |
|  | Direction at right angles 100° C. (%) | 70 | 65 | 73 | 50 | 55 | 56 | 61 | 70 | 74 |
| Shrinkage ratio at the point of intersection |  | 21 | 10 | 32 | 3 | 4.8 | 30 | 6 | 30 | 40 |
| Residual stress retention time |  | 10 min. or more | 10 min. or more | 10 min. or more | 47 sec. | 2 min. 10 sec. | 10 min. or more | 8 min. 15 sec. | 10 min. or more | 10 min. or more |
| Practical applications | Shrinkage spots (neck of bottle) | ◉ | ○ | ◉ | × | × | ◎ | ○ | ◎ | ◎ |
|  | Colored spots (with use of metellic ink) | ◉ | ○ | ◎ | × | Δ | ◎ | ○ | ◎ | ◎ |
|  | Uniformity of label | ◉ | ○ | ◎ | × | × | ◎ | ○ | ◎ | ◎ |
|  | Fitness of label | ◉ | ○ | ◎ | × | Δ | ◎ | ○ | ◎ | ◎ |
|  | Appearance after heat treatment [a] | ◎ | ◉ | ◎ | × | × | × | ◎ | ◎ | ◎ |
|  | Test with dropping Without heat treatment | ◎ | ◎ | ◎ | × | × | ◉ | ◉ | ◉ | ◉ |

TABLE 1-continued

| | | Comparative Example | | | Example | | | | | | |
|---|---|---|---|---|---|---|---|---|---|---|---|
| | | 4 | 5 | 6 | 7 | 8 | 9 | 10 | 11 | 12 | 13 |
| of bottle [b] | After heat treatment | ● | ○ | ○ | ○ | × | × | — | ○ | ● | ● |
| Haze (%) | | 1.8 | 1.9 | — | 1.7 | 1.6 | 1.5 | 1.6 | 2.2 | 2.8 | 3.2 |
| Heat-shrinkage ratio | Main direction of stretching 80° C. (%) | 5.9 | 10.5 | — | 3.8 | −2.0 | −2.5 | −3.0 | −1.5 | 1 | −2.1 |
| | Direction at right angles 80° C. (%) | 33 | 22 | — | 46 | 46 | 44 | 49 | 40 | 47 | 39 |
| | Main direction of stretching 100° C. (%) | 8.6 | 13.6 | — | 2.1 | −1.5 | −1.8 | −2.1 | −0.5 | 2.0 | −1.1 |
| | Direction at right angles 100° C. (%) | 45 | 58 | — | 62 | 72 | 74 | 71 | 73 | 62 | 55 |
| Shrinkage ratio at the point of intersection | | 3 | 45 | — | 11 | 20 | 25 | 30 | 26 | 18 | 16 |
| Residual stress retention time | | 2 min. 10 sec. | 10 min. or more | — | 9 min. 3 sec. | 10 min. or more | 10 min. or more | 9 min. 10 sec. | 10 min. or more | 10 min. or more | 10 min. or more |
| Practical applications | Shrinkage spots (neck of bottle) | ○ | △ | — | ○ | ◉ | ◉ | ○ | ◉ | ◉ | ○ |
| | Colored spots (with use of metellic ink) | △ | △ | — | ○ | ◉ | ◉ | ◉ | ◉ | ◉ | ○ |
| | Uniformity of label | △ | △ | — | ○ | ◉ | ◉ | ◉ | ◉ | ◉ | ○ |
| | Fitness of label | △ | × | — | ○ | ◉ | ◉ | ○ | ○ | ◉ | ○ |
| | Appearance after heat treatment [a] | △ | × | — | ◉ | ◉ | ◉ | ◉ | ◉ | ◉ | ◉ |
| Test with dropping of bottle [b] | Without heat treatment | ○ | △ | — | ○ | ◉ | ◉ | ● | ◉ | ◉ | ○ |
| | After heat treatment | △ | × | — | ○ | ◉ | ● | ○ | ○ | ● | ○ |

[a] at 125° C. for 30 min.
[b] dropped 75 cm.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A thermo-shrinkable polyester film obtained from a composition that comprises acid components including terephthalic acid and glycol components including ethylene glycol, wherein a film prepared from said composition is stretched in a certain direction by a stretching ratio of 4.0 or more, so that the resulting thermo-shrinkable polyester film has a heat-shrinkage ratio of 30% or more in said direction at 100° C. and a shrinkage ratio of 5% or more at the point of intersection of a curve showing the internal shrinkage stress of said thermo-shrinkable film and a curve showing the tensile stress of said thermo-shrinkable film.

2. A thermo-shrinkable polyester film according to claim 1, wherein said film has a transformation ratio of 0.175 or more.

3. A thermo-shrinkable polyester film according to claim 1 or 2, wherein said glycol components include the compounds with the following general formulae (I) and/or (II) in the range of 3 to 65 percent by mole based on total moles of glycol components:

wherein $R_1$ and $R_2$ are independently $C_1$–$C_5$ alkyl, wherein —X— is —$CH_2$—,

—O—, —$SO_2$—, —S—, $R_3$ and $R_4$ are independently hydrogen, $C_1$–$C_5$ alkyl, or halogen; l is 0 or 1, m and n are both an integer of 1 to 5; o and p are both an integer of 1 to 4.

4. A thermo-shrinkable polyester film according to claim 1, wherein the film is also stretched in the transverse direction by a stretching ratio of 2.0 or less.

5. A thermo-shrinkable polyester film according to claim 1, wherein the film is not stretched in the transverse direction.

6. A thermo-shrinkable polyester film according to claim 1, wherein the resulting thermo-shrinkable polyester film has a heat-shrinkage ratio of 15% or less in the transverse direction.

7. A thermo-shrinkable polyester film according to claim 6, wherein the resulting thermo-shrinkable polyester film has a heat-shrinkage ratio of 5% or less in the transverse direction.

8. A thermo-shrinkable polyester film obtained from a composition that comprises acid components including terephthalic acid and glycol components including ethylene glycol wherein said film has a heat-shrinkage ratio of 30% or more in a certain direction at 100° C., a heat-shrinkage ratio of 15% or less in the transverse direction, and a shrinkage ratio of 5% or more at the point of intersection of a curve of the internal shrinkage stress of said film and a curve of the tensile stress of said film.

9. A thermo-shrinkable polyester film according to claim 8, wherein the resulting thermo-shrinkable polyester film has a heat-shrinkage ratio of 5% or less in the transverse direction.

* * * * *

UNITED STATES PATENT AND TRADEMARK OFFICE
CERTIFICATE OF CORRECTION

PATENT NO. : 4,996,291
DATED : February 26, 1991
INVENTOR(S) : Yoshinaka et al.

It is certified that error appears in the above-identified patent and that said Letters Patent is hereby corrected as shown below:

ON THE TITLE PAGE UNDER THE INVENTORS:

Residence of Tsutomu Isaka, change "Komaki" to -- Aichi --;

Residence of Toshihiro Yamashita, change "Inuyama" to -- Aichi --;

Residence of Yujiro Matsuyama, change "Otsu" to -- Shiga --; and

Residence of Osamu Makimura, change "Ogaki" to -- Gifu --.

In column 16, line 55, after the formulas "-O-, -$SO_2$-, -S-," insert the word -- or --.

Signed and Sealed this

Twenty-seventh Day of October, 1992

*Attest:*

DOUGLAS B. COMER

*Attesting Officer*      *Acting Commissioner of Patents and Trademarks*